United States Patent
Yamashita et al.

(10) Patent No.: US 7,618,745 B2
(45) Date of Patent: Nov. 17, 2009

(54) SEALED BATTERY

(75) Inventors: Shuichi Yamashita, Itano-gun (JP); Masanori Ohgi, Tokushima (JP); Hiromitsu Suwa, Naruto (JP); Yasunori Okazaki, Tokushima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/655,256

(22) Filed: Jan. 19, 2007

(65) Prior Publication Data

US 2007/0172728 A1 Jul. 26, 2007

(30) Foreign Application Priority Data

Jan. 23, 2006 (JP) .............................. 2006-013485

(51) Int. Cl.
   H01M 2/08 (2006.01)
   H01M 2/02 (2006.01)
(52) U.S. Cl. .................... 429/185; 429/174; 429/181
(58) Field of Classification Search ............... 429/53, 429/174, 181, 185, 175
   See application file for complete search history.

(56) References Cited

U.S. PATENT DOCUMENTS 4,000,952 A * 1/1977 Bryan et al. ................ 403/271

2006/0275657 A1 * 12/2006 Kozuki et al. ............... 429/185

FOREIGN PATENT DOCUMENTS

| JP | 2000-90892 A | 3/2000 |
| JP | 2001-15155 A | 1/2001 |
| JP | 2004-296363 A | 10/2004 |
| JP | 2005-276458 A | 10/2005 |

* cited by examiner

Primary Examiner—Patrick Ryan
Assistant Examiner—Muhammad Siddiquee
(74) Attorney, Agent, or Firm—Westerman, Hattori, Daniels & Adrian, LLP.

(57) ABSTRACT

A sealed battery according to the present invention includes a sealing body 18A having a terminal cap 19' made of an iron-based material and a safety valve 25 made of an aluminum-based material. In the sealing body 18A, at least one of the flange of the terminal cap 19' and the flange of the safety valve 25 has a portion defining a space 30. The flanges of the terminal cap and of the safety valve are welded at a position corresponding to the space with high-energy rays. It is thus possible to provide the sealed battery including the sealing body having a current interrupt function in which resistance between the terminal cap and the safety valve is kept low, thereby being suitable for large-current applications.

9 Claims, 7 Drawing Sheets

SEALED BATTERY

FIELD OF THE INVENTION

The present invention relates to a sealed battery. More particularly, the present invention relates to a sealed battery including a sealing body having a current interrupt function in which a negative electrode or positive electrode terminal cap and a safety valve are directly welded with a laser beam or other high-energy rays for increasing the welding strength between the two without increasing the electrical resistance of the battery in use.

BACKGROUND OF THE INVENTION

The ongoing surge in the development of lightweight and space economical electronic devices has raised the need for lighter and smaller batteries as their power supplies. To meet this requirement, sealed nonaqueous electrolyte secondary batteries represented by lithium-ion secondary batteries, which are compact, lightweight, high capacity, chargeable and dischargeable, have been in practical use for compact camcorders, mobile phones, notebook computers, and other mobile electronics and communications equipment, for example.

Referring to FIGS. 4 and 5, a typical structure of such sealed nonaqueous electrolyte secondary batteries will be described. FIG. 4 is a perspective view showing a longitudinal section of a cylindrical nonaqueous electrolyte secondary battery disclosed in JP-2001-15155-A. FIG. 5 is an enlarged partial cutaway view of the sealing body shown in FIG. 4. This nonaqueous electrolyte secondary battery 10 is manufactured by the following process: rolling a positive electrode plate 11 and a negative electrode plate 12 with a separator 13 therebetween to provide a spiral electrode unit 14, placing insulators 15 and 16 on the top and bottom of the electrode unit 14 and thereafter laying the electrode unit in a steel cylindrical outer can 17 also serving as a negative electrode terminal, welding a current collecting tab 12a of the negative electrode plate 12 to the inside bottom of the outer can 17 and welding a current collecting tab 11a of the positive electrode plate 11 to a bottom plate of a sealing body 18D with a built-in safety device, injecting a predetermined nonaqueous electrolyte from an opening of the outer can 17, and tightly sealing the outer can 17 with the sealing body 18D.

Referring to FIG. 5, the sealing body 18D includes an inverted-dish-shaped terminal cap 19 and a dish-shaped bottom plate 20 both of which are made of stainless steel. The terminal cap 19 has a convex portion 21 protruding outwardly from the battery, and a flat flange 22 serving as the base of the convex portion 21. At the corner edge of the convex portion 21, a plurality of gas vent holes 21a are formed. The bottom plate 20 has a concave portion 23 protruding inward of the battery, and a flat flange 24 serving as the base of the concave portion 23. At the corner edge of the concave portion 23, a gas vent hole 23a is formed.

Accommodated inside the terminal cap 19 and bottom plate 20 is an aluminum safety valve 25 whose shape changes when the battery's internal gas pressure increases to reach a predetermined level. The safety valve 25 has a concave portion 25a and a flange 25b, and made of aluminum foil that is 0.2 mm thick with a 0.005-mm concavo-convex surface, for example. The bottommost part of the concave portion 25a is placed so as to be in contact with the upper surface of the concave portion 23 of the bottom plate 20. The flange 25b is sandwiched between the flange 22 of the terminal cap 19 and the flange 24 of the bottom plate 20. On a part upon the flange 25b of the safety valve 25, a positive temperature coefficient (PTC) thermistor element 26 is provided. The terminal cap 19 and bottom plate 20 are liquid-tightly fixed to each other. Specifically, the flange 24 of the bottom plate 20 is fixed to the terminal cap 19 side with a polypropylene (PP) insulating gasket 27 for a sealing body therebetween, for example.

In the nonaqueous electrolyte secondary battery 10, when an excess current flows in the battery to an extent that causes abnormal heat, the resistance of the PTC thermistor element 26 in the sealing body 18D having a current interrupt function increases, thereby suppressing the excess current. Furthermore, the shape of the concave portion 25a of the safety valve 25 changes when the battery's internal gas pressure increases to reach a predetermined level in order to interrupt contact between the safety valve 25 and the concave portion 23 of the bottom plate 20, thereby interrupting an excess or short-circuit current. It is therefore possible to provide a sealed nonaqueous electrolyte secondary battery that is highly safe.

JP-2000-90892-A discloses a secondary battery for large current discharge including a sealing body whose electrical resistance is kept low. Referring to FIG. 6, which is an enlarged sectional view of this sealing body 40, the body includes from the inside of the battery a dish-shaped bottom plate 41 made of aluminum, a thin-plate safety valve 42 made of aluminum, and a positive electrode terminal cap 43 made of nickel-plated iron that are placed on top of each other. Provided between the bottom plate 41 and safety valve 42 is a ring-like valve retainer 44 made of butyl rubber for tight sealing. The terminal cap 43 and bottom plate 41 are fixed to each other on the periphery, and moreover, the bottom plate, safety valve, and terminal cap are spot-welded at four points 47 with a diameter of 3 mm on a flange 46 on the inside of a fixing member 45 provided to the periphery, thereby completing the united sealing body 40.

Against the background of intensifying calls for environmental protection, regulations on emissions of carbon dioxide and similar gases have been tightened. In the automobile world, development of electric vehicles (EVs) and hybrid electric vehicles (HEVs) is being vigorously pursued in addition to vehicles using gasoline, diesel oil, natural gas and other fossil fuels. Furthermore, the soaring rise in the price of fossil fuels over recent years has given a boost to the development of EVs and HEVs. In addition, sealed batteries represented by lithium-ion secondary batteries have been developed for use in machine tools.

Batteries for EVs, HEVs, and machine tools are required not only to be environmentally friendly, but also to have high-level basic performance as automobiles or tools, that is, large power supply capacity. However, the PTC thermistor element serving as a safety device in nonaqueous electrolyte secondary batteries as disclosed in JP-2001-15155-A restricts the amount of current to be supplied. Therefore, secondary batteries without requiring such a thermistor element have been developed to achieve large power supply.

FIG. 7 is a sectional view illustrating a sealing body 18E having a current interrupt function without requiring a PTC thermistor element. Since this sealing body 18E has the same structure as that of the sealing body 18D shown in FIG. 5 except for the presence of a PTC thermistor element 26, the like numerals indicate like elements in FIGS. 5 and 7 and the description thereof will be omitted here.

If the sealing body 18E having a current interrupt function without requiring a PTC thermistor element is used in the batteries for EVs, HEVs, and machine tools, the batteries can supply large power thanks to their low internal resistance. However, the temperature of the batteries may reach 80 degrees Celsius or more, whereby repeated use may cause heat effects on the PP insulating gasket 27 provided between the terminal cap 19 and bottom plate 20. If the elasticity of the gasket 27 decreases, the contact pressure between the terminal cap 19 and safety valve 25 decreases, thereby increasing or fluctuating the batteries' internal resistance.

As regards the secondary battery for large current discharge disclosed in JP-2000-90892-A, since the positive electrode terminal cap, safety valve, and bottom plate are spot-welded, electrical resistance between the terminal cap and bottom plate is kept low and relatively constant without increasing the area of the battery's output terminal. Accordingly, the battery has an advantage in that its output current can be increased without increasing its weight. However, the sealing body used here has a problem in that a current keeps flowing even if something abnormal happens in the battery, for example, the shape of the safety valve changes or the battery opens with an increased internal gas pressure, since the positive electrode terminal cap, safety valve, and bottom plate are spot-welded and there is no current interrupt means provided between the terminal cap and bottom plate.

Typically, while the positive electrode terminal cap is made of a hard iron-based material, such as nickel-plated iron or stainless steel, the safety valve is made of a thin aluminum-based material with a need for flexibility. The bottom plate is made of aluminum to avoid dissimilar metal contact, since a positive electrode current collecting body in a lithium-ion secondary battery is typically made of aluminum.

To enhance manufacturing efficiency, spot-welding with high-energy rays such as laser or electron beams are widely used these days. Since aluminum has extremely high heat conductivity compared with iron-based materials such as nickel-plated iron and stainless steel, welding with high-energy rays from the terminal cap side, for example, can melt the surface of the terminal cap desirably, while failing to melt the contact portions of the terminal cap and safety valve with an insufficient temperature increase in these portions. Accordingly, it is difficult to strongly weld the terminal cap and safety valve.

SUMMARY

In consideration with the above-mentioned issues in the related art, the present invention provides a sealed battery including a sealing body having a current interrupt function in which a negative electrode or positive electrode terminal cap and safety valve are strongly welding while the resistance of the battery in use is kept low.

The present invention provides the following features. According to a first aspect of the invention, a sealed battery includes a sealing part having an inverted-dish-shaped terminal cap made of an iron-based material and provided to at least one of a negative electrode and a positive electrode of the battery, and a dish-shaped safety valve made of an aluminum-based material for interrupting electrical connection between inside and outside of the battery. At least one of a flange face of the terminal cap and a flange face of the safety valve facing each other has a portion defining a space. The flange of the terminal cap and the flange of the safety valve are welded at a position corresponding to the space with a high-energy ray.

It is preferable that the space be an annular groove.
It is preferable that the space is at least 0.05 mm deep and at most half as deep as any side having the space.
It is preferable that the high-energy ray be a laser beam or an electron beam.

According to a second aspect of the invention, a sealed battery includes a sealing part having an inverted-dish-shaped terminal cap made of an iron-based material and provided to at least one of a negative electrode and a positive electrode of the battery, a dish-shaped safety valve made of an aluminum-based material for interrupting electrical connection between inside and outside of the battery, and a ring-like interposed material interposed between the terminal cap and the safety valve, made of a material identical to a material for the safety valve, and being as thick as or thinner than the safety valve. The interposed material and the safety valve are welded with a high-energy ray. At least one of a flange face of the terminal cap and a face of the interposed material facing each other has a portion defining a space. The flange of the terminal cap and the interposed material are welded at a position corresponding to the space with a high-energy ray.

It is preferable that the interposed material be at most 70% as thick as the terminal cap.
It is preferable that the space be an annular groove.
It is preferable that the space is at least 0.05 mm deep and at most half as deep as any side having the space.
It is preferable that the high-energy ray be a laser beam or an electron beam.

The above-described features according to the invention provide a sealed battery with the following advantages. According to the first aspect of the invention, since at least one of the flange faces of the terminal cap and of the safety valve facing each other has a space, the portion having this space has low heat conductivity. Since the diffusion rate of heat generated by the high-energy ray applied to a position corresponding to the space in the flange of the terminal cap toward the safety valve side decreases, the flange of the safety valve melts only after the flange of the terminal cap irradiated with the high-energy ray melts sufficiently. Accordingly, welding strength between the flanges of the terminal cap and of the safety valve is significantly high, and electrical resistance between the terminal cap and safety valve in use is kept low. It is therefore possible to provide a sealed battery whose in-use resistance is kept low. In addition, the sealed battery is highly safe, provided with a current interrupt function for interrupting electrical connection between inside and outside of the battery. For example, a current interrupt mechanism for interrupting electrical connection by changing the shape of the safety valve with an increase in the battery's internal pressure can be used here.

In this aspect, the iron-based material may be nickel-plated iron or stainless steel, while the aluminum metal may be flexible aluminum or aluminum alloy. The number of welding points (e.g. four) can be appropriately set in consideration of required welding strength and resultant electrical resistance, and the flange is not necessarily required to be thoroughly welded. Furthermore, the space can be provided to either the terminal cap or the safety valve, and can be provided to both.

Preferably in this aspect, since the space is annular, it can be easily processed and allow discretionary welding positioning around the terminal cap, thereby increasing design flexibility.

Preferably in this aspect, if the space is at least 0.05 mm deep, the welding strength between the flanges of the terminal cap and of the safety valve is significantly high because of this space. The space that is at most half as deep as any side having space provides desirable welding strength, since too deep a space will decrease the strength of the flange of the terminal cap or the safety valve having the space. On the contrary, if the space is shallower than 0.05 mm, there is no decrease in heat conductivity between the flanges of the terminal cap and of the safety valve because of this space, thereby providing no increase in welding strength.

Preferably in this aspect, since both laser and electron beams are widely used as welding high-energy rays, it is possible to provide a sealed battery with a reliable and high quality welded portion.

According to the second aspect of the invention, since the interposed material and the safety valve are made of the same material and the interposed material is thinner than the safety valve, the two are strongly welded with a high-energy ray without perforation in the safety valve. Furthermore, the space is provided between the terminal cap and interposed material in the same manner as in the first aspect. Accordingly, the terminal cap and safety valve are strongly welded with a high-energy ray. Accordingly, since electrical resistance between the terminal cap and the safety valve in use is kept low, it is possible to provide a sealed battery whose electrical resistance in use is kept low. In addition, the sealed battery is highly safe, provided with a current interrupt function for interrupting electrical connection between inside and outside of the battery. For example, a current interrupt mechanism for interrupting electrical connection by changing the shape of the safety valve with an increase in the battery's internal pressure can be used as in the first aspect. It is noted that making the interposed material thicker than the safety valve, which is likely to cause perforation in the safety valve while welding with the high-energy ray, is undesirable.

Preferably in this aspect, the thickness of the interposed material exceeding 70% of that of the terminal cap makes it difficult for the interposed material to melt due to its good heat conductivity, thereby resulting in a decrease in welding strength between the terminal cap and the interposed material.

DESCRIPTION OF THE PREFERRED EMBODIMENTS

Figure 1:
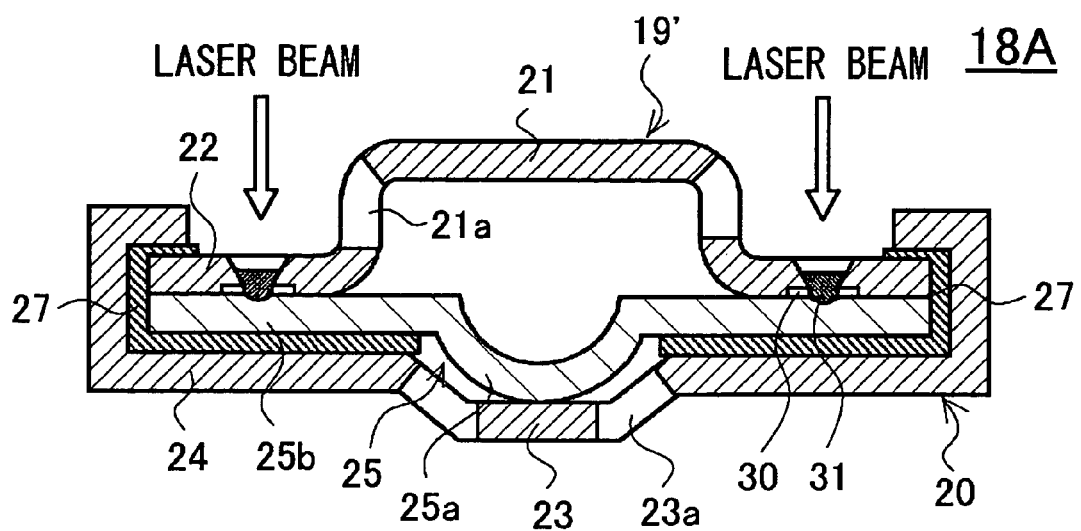
FIG. 1 is an enlarged sectional view of a sealing body used in a first embodiment according to the present invention.
Figure 2:
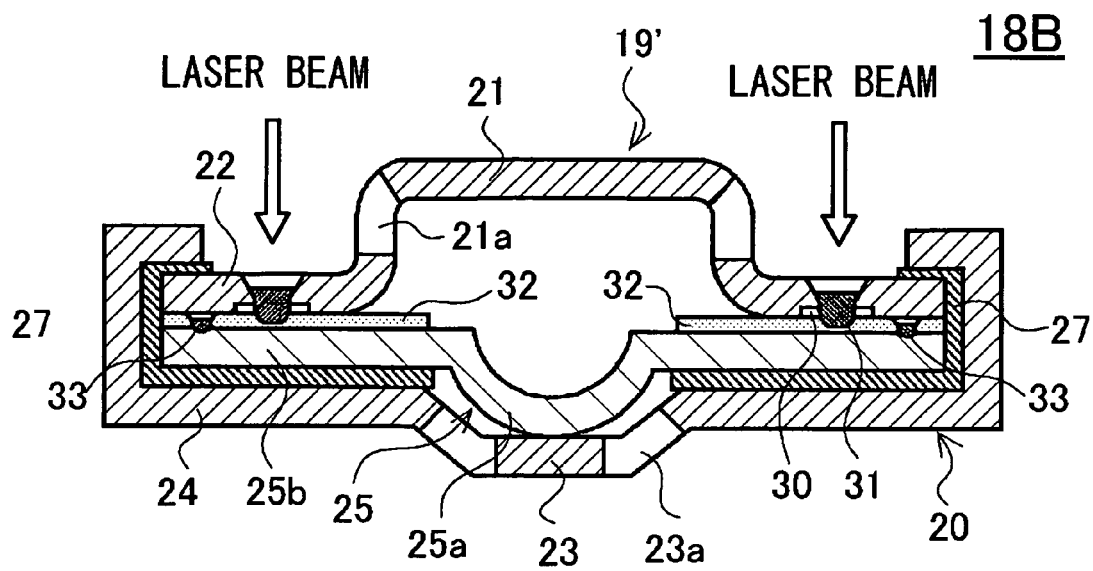
FIG. 2 is an enlarged sectional view of a sealing body used in a second embodiment according to the invention.
Figure 3:
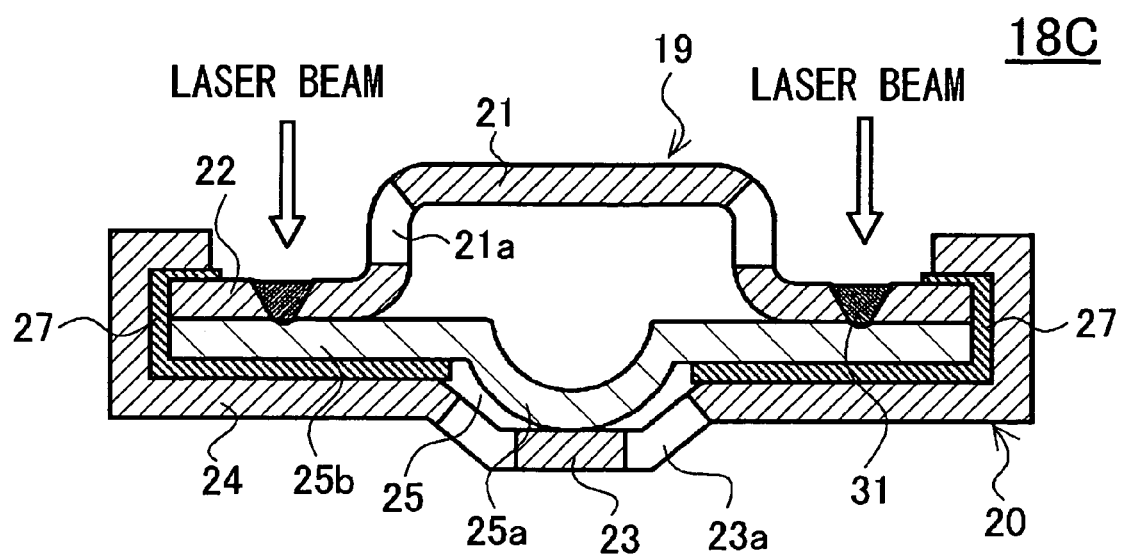
FIG. 3 is an enlarged sectional view of a sealing body used in a comparative example.
Figure 4:
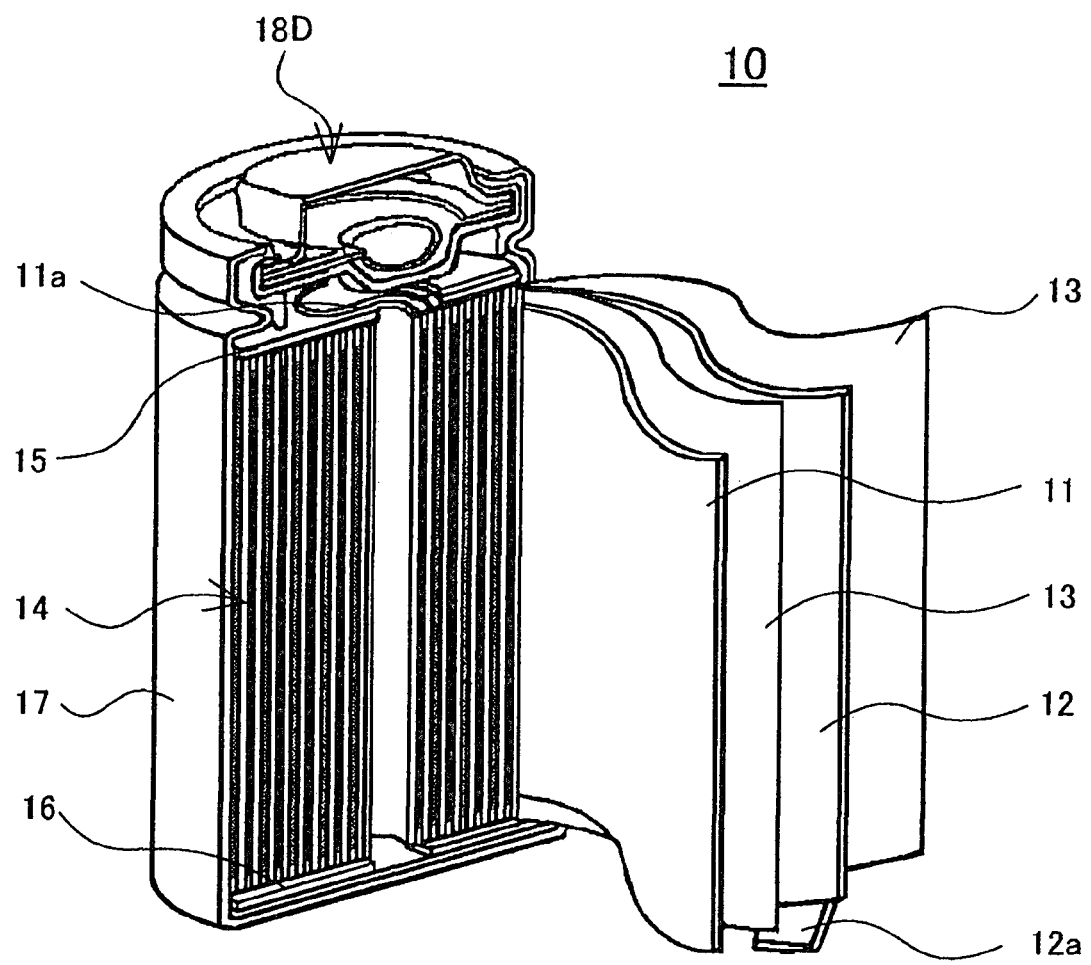
FIG. 4 is a perspective view showing a longitudinal section of a related-art cylindrical nonaqueous electrolyte secondary battery.
Figure 5:
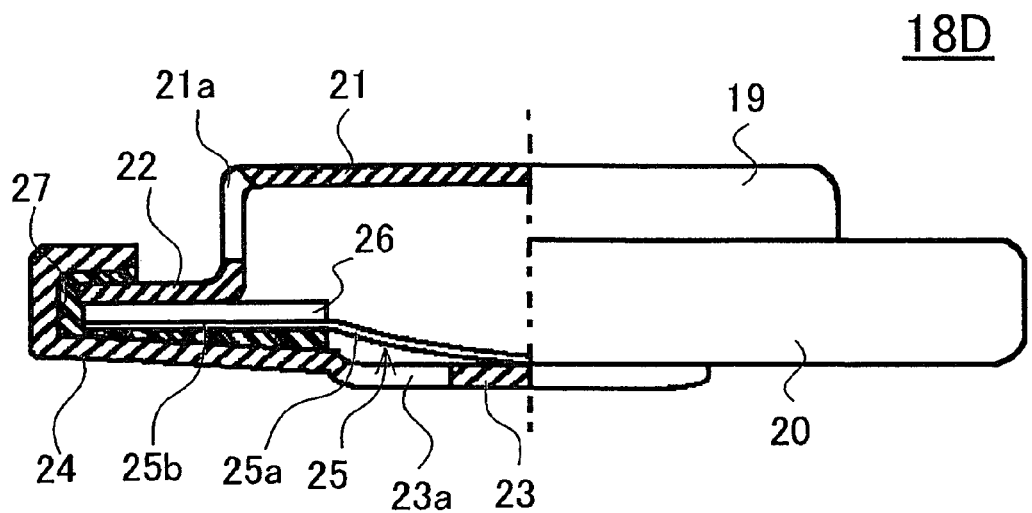
FIG. 5 is an enlarged partial cutaway view of a sealing body shown in FIG. 4.
Figure 6:
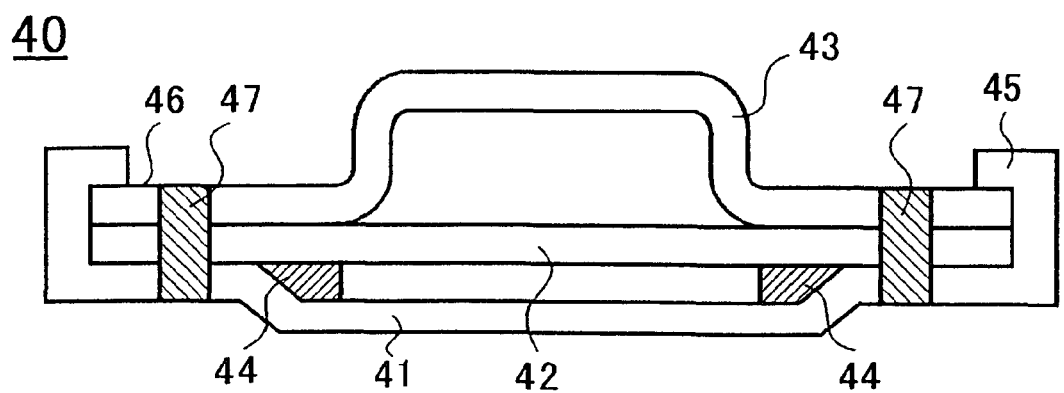
FIG. 6 is an enlarged sectional view of a sealing body used in a related-art secondary battery for large current discharge.
Figure 7:
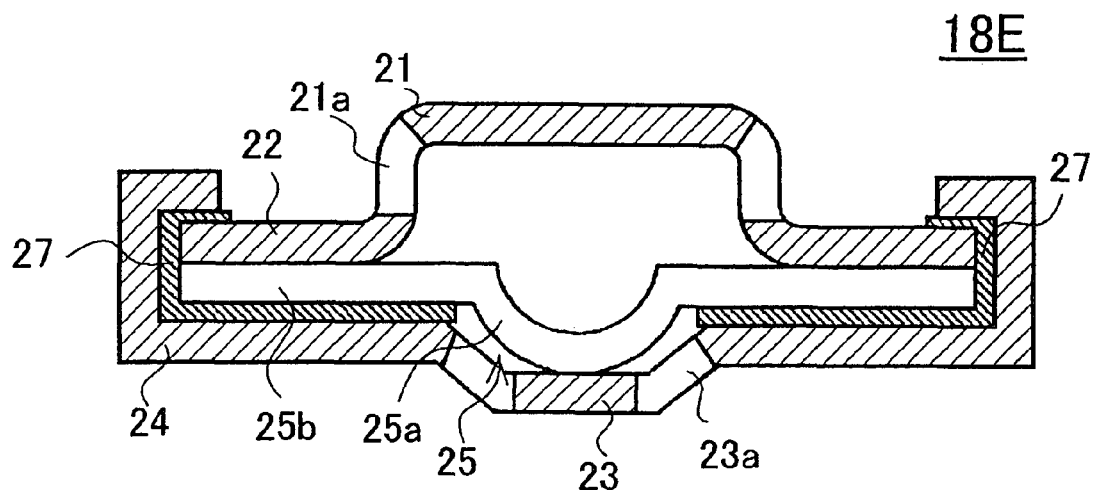
FIG. 7 is an enlarged sectional view of a sealing body having a current interrupt function without requiring a related-art PTC thermistor element.

Preferred embodiments according to the invention will be described with reference to FIGS. 1 to 3. It should be noted that the description of the embodiments below is given to illustrate a sealing body having a current interrupt function that can be used in the related-art lithium-ion nonaqueous electrolyte secondary battery shown in FIG. 4 as an example of a sealed battery that embodies the concept of the invention and is not intended to limit the invention to lithium-ion nonaqueous electrolyte secondary batteries including sealing bodies with this function. The invention is also applicable to various types of sealed batteries without departing from the spirit and scope of the claims appended hereto. FIG. 1 is an enlarged sectional view of a sealing body used in a first embodiment according to the invention. FIG. 2 is an enlarged sectional view of a sealing body used in a second embodiment according to the invention. FIG. 3 is an enlarged sectional view of a sealing body used in a comparative example. The like numerals indicate like elements in these drawings and in FIGS. 5 and 7 showing the related-art sealing bodies with a current interrupt function.

A manufacturing process of a sealing body 18A according to the first embodiment will now be described. The dish-shaped bottom plate 20 made of aluminum and having the same structure as that used in the above-described related-art sealing bodies is prepared. The bottom plate 20 has the concave portion 23 protruding inwardly of the battery, and the flat flange 24 serving as the base of the concave portion 23. At the corner edge of the concave portion 23, the gas vent hole 23a is formed. On the flange 24 of the bottom plate 20, the annular insulating gasket 27 made of PP is mounted. Also as in the above-described related art, the safety valve 25 made of aluminum foil that is 0.2 mm thick, for example, and including the concave portion 25a and the flange 25b is placed so that the flange 25b is laid upon the insulating gasket 27 and the concave portion 25a of the safety valve 25 is laid upon the concave portion 23 of the bottom plate 20. The bottommost part of the concave portion 25a of the safety valve 25 and the concave portion 23 of the bottom plate 20 are ultrasonic-welded.

The terminal cap 19' having the same structure (inverted dish) as in the above-described related-art sealing bodies is prepared. Here, the terminal cap is made of nickel-plated iron with a diameter of 23.0 mm and a thickness of 0.3 mm. The terminal cap 19' has the convex portion 21 protruding outwardly of the battery, and the flat flange 22 serving as the base of the convex portion 21. At the corner edge of the convex portion 21, the plurality of gas vent holes 21a are formed. In the first embodiment, the face of the flange 22 of the terminal cap 19' facing the flange 25b of the safety valve 25 is cut to have an annular groove 30 with a width of 1.5 mm and a depth of 0.1 mm as shown in FIG. 1. Accordingly, this terminal cap 19' used in the first embodiment differs from the related-art terminal cap 19 in than it has the annular groove 30.

The terminal cap 19' with the groove 30 is placed on the safety valve 25. Subsequently, four points on the width centerline of the groove 30 are laser-welded at regular intervals from the terminal cap 19' side for fixing the flange 24 of the bottom plate 20. The sealing body 18A having a current interrupt function according to the first embodiment is thus completed.

A sealing body 18B according to a second embodiment of the invention is manufactured through a process similar to that of the first embodiment, except that an interposed material 32 is added between the safety valve 25 and terminal cap 19'. Here, the interposed material 32 is annular, half as thick as the safety valve 25, and made of the same aluminum-based material as the safety valve 25. The material is placed on the flange 25b of the safety valve 25. Subsequently, four points are laser-welded at regular intervals from the surface of the interposed material 32 for uniting the interposed material 32 and safety valve 25. With the terminal cap 19' having the annular groove 30 as in the first embodiment placed on the surface of the interposed material 32, four points corresponding to the groove 30 are laser-welded at regular intervals from the terminal cap 19' side as in the first embodiment for fixing the flange 24 of the bottom plate 20. The sealing body 18B having a current interrupt function according to the second embodiment is thus completed.

Comparative Example

A sealing body 18C having a current interrupt function according to a comparative example is manufactured through a process similar to that of the first embodiment, except that the terminal cap 19 having no groove 30 is used instead of the terminal cap 19' having the annular groove 30. Referring to FIG. 3, the sealing body 18C in the comparative example has a shallow recess in a welded portion 31 as it has no groove 30.

Vibration, post-drop resistance increase, and drop strength tests were conducted as described in detail below. Each test used thirty pieces of the sealing bodies 18A to 18C each having a current interrupt function according to the first and second embodiments and comparative example. Table 1 shows measurement results.

Vibration Test

In the vibration test, the pieces were vibrated at an acceleration of 2.5 G, amplitude of 1.5 mm, and frequency of 30 Hz for three hours with a marketed vibration tester. Internal resistance was measured before and after the vibration. For each of the sealing bodies 18A to 18C, the average of resistance increases was calculated if the welded portion remained engaged in all of the thirty pieces after the vibration. If the welded portion was disengaged in any of the pieces, the number of such pieces was counted.

Post-Drop Resistance Increase Test and Drop Strength Test

The post-drop resistance increase test used thirty pieces of the sealing bodies 18A to 18C each to be dropped freely from a height of 1.9 meters onto a concrete floor. Internal resistance was measured before and after the drop. The average of resistance increases was calculated if the welded portion remained engaged in all of the thirty pieces after up to thirty times of the drop. If the welded portion was disengaged in any of the pieces, the number of such pieces was counted. Furthermore, the number of times for which the welded portion was disengaged in the process of this test was counted and averaged in the drop strength test.

TABLE 1

|  | After vibration test* | | After drop test** | | |
| --- | --- | --- | --- | --- | --- |
|  | Resistance increase | # of welded portions disengaged | Resistance increase | # of welded portions disengaged | Drop strength*** (times) |
| First embodiment | 0.1 mΩ | 0/30 | — | 30/30 | 15 |
| Second embodiment | 0.1 mΩ | 0/30 | 0.1 mΩ | 0/30 | >30 |
| Comparative example | — | 10/30 | — | 30/30 | 2 |

*At 30 Hz, for three hours
**From 1.9 m, up to 30 times
***Average times before welded portions were disengaged in the drop test Table 1 reveals the following facts. Regarding the sealing body 18C of the comparative example having no space, the welded portion was disengaged in ten out of thirty pieces in the vibration test, and in all of the thirty pieces in the post-drop resistance increase test. The number of drop times for which the welded portion of the sealing body 18C was disengaged was two on average.

As regards the sealing body 18A according to the first embodiment including a terminal cap having a space (annular groove), no welded portion was disengaged in the vibration test. The internal resistance increase after the vibration test was 0.1 mΩ on average. While the welded portion of this sealing body 18A was disengaged in all of the thirty pieces in the post-drop resistance increase test, the number of drop times for which the welded portion was disengaged was 15 on average, which means the welded portion is stronger than its counterpart in the sealing body 18C of the comparative example. Since the only difference in the sealing bodies 18A and 18C was the presence of an annular groove in their terminal caps, the higher strength of the sealing body 18A is clearly attributed to this groove.

As for the sealing body 18B according to the second embodiment including a terminal cap having a space (annular groove) and also having an interposed material between its safety valve and terminal cap, no welded portion was disengaged in the vibration test. The internal resistance increase after the vibration test was 0.1 mΩ on average. Furthermore, no welded portion of the sealing body 18B was disengaged through thirty drops in the post-drop resistance increase test. Here, the internal resistance increase was 0.1 mΩ on average. Accordingly, the sealing body 18B of the second embodiment provided the best results.

The sealing body 18B of the second embodiment, however, requires one more welding compared with the sealing body 18A of the first embodiment. Therefore, the user may select either the sealing body 18A or 18B in consideration with necessary strength.

While laser welding is employed in the first and second embodiments, electron beam welding can also achieve the same advantages as described above. Also, while the space provided to the terminal cap is an annular groove in the first and second embodiments, it may be a circular or square recess. In this case, since the recess is not readily identifiable from the backside to which the terminal cap is welded, it is necessary to provide a certain means to show the position of the recess from the backside. Furthermore, while the groove was provided to the terminal cap in the first and second embodiments, the groove may be provided to the safety valve or both the terminal cap and safety valve, as a space between the terminal cap and safety valve can provide the same advantages as described above.

In addition, while a sealed battery including a sealing body whose terminal cap and safety valve are fixed to a bottom plate is described in the above-described embodiments, other types of sealed batteries, for example, in which an outer can containing an electrode unit has a constricted part near its opening, and a sealing gasket, a safety valve, and a terminal cap are mounted and fixed with the opening edge of the outer can may provide the same advantages as described above.

The invention claimed is:

1. A sealed battery comprising:
 a sealing part, said sealing part including:
  an inverted-dish-shaped terminal cap made of an iron-based material and provided to at least one of a negative electrode and a positive electrode of said battery; and
  a dish-shaped safety valve made of an aluminum-based material for interrupting electrical connection between inside and outside of said battery;
 at least one of a flange face of said terminal cap and a flange face of said safety valve facing each other having a portion defining a space, and
 said flange of said terminal cap and said flange of said safety valve being welded at a position corresponding to said space with a high-energy ray;

wherein a welding portion corresponding to the location of said space is depressed by said space.

2. The sealed battery according to claim 1, wherein said space is an annular groove.

3. The sealed battery according to claim 1, wherein said space is at least 0.05 mm deep and at most half as deep as any side having said space.

4. The sealed battery according to claim 1, wherein said high-energy ray is a laser beam or an electron beam.

5. A sealed battery comprising:
- a sealing part, said sealing part including:
- an inverted-dish-shaped terminal cap made of an iron-based material and provided to at least one of a negative electrode and a positive electrode of said battery;
- a dish-shaped safety valve made of an aluminum-based material for interrupting electrical connection between inside and outside of said battery; and
- a ring-like interposed material interposed between said terminal cap and said safety valve, made of a material identical to a material for said safety valve, and being as thick as or thinner than said safety valve;
- said interposed material and said safety valve being welded with a high-energy ray,
- at least one of a flange face of said terminal cap and a face of said interposed material facing each other having a portion defining a space, and
- said flange of said terminal cap and said interposed material being welded at a position corresponding to said space with a high-energy ray.

6. The sealed battery according to claim 5, wherein said interposed material is at most 70% as thick as said terminal cap.

7. The sealed battery according to claim 5, wherein said space is an annular groove.

8. The sealed battery according to claim 5, wherein said space is at least 0.05 mm deep and at most half as deep as any side having said space.

9. The sealed battery according to claim 5, wherein said high-energy ray is a laser beam or an electron beam.

* * * * *